(12) United States Patent
Liu (10) Patent No.: US 11,178,699 B2
(45) Date of Patent: Nov. 16, 2021

(54) RANDOM ACCESS METHOD AND APPARATUS, USER EQUIPMENT, AND COMPUTER READABLE STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 100 days.

(21) Appl. No.: 16/610,906

(22) PCT Filed: May 5, 2017

(86) PCT No.: PCT/CN2017/083186
§ 371 (c)(1),
(2) Date: Nov. 4, 2019

(87) PCT Pub. No.: WO2018/201439
PCT Pub. Date: Nov. 8, 2018

(65) Prior Publication Data
US 2020/0163119 A1    May 21, 2020

(51) Int. Cl.
*H04W 74/08*    (2009.01)
*H04W 72/04*    (2009.01)

(52) U.S. Cl.
CPC ..... *H04W 74/0833* (2013.01); *H04W 72/046* (2013.01)

(58) Field of Classification Search
CPC ........... H04W 74/0833; H04W 72/046; H04W 52/48; H04W 52/50; H04B 7/0695
See application file for complete search history.

(56) References Cited

U.S. PATENT DOCUMENTS

| 2015/0334743 | A1  | 11/2015 | Chevallier et al. |
| 2015/0373740 | A1* | 12/2015 | Eriksson ........... H04W 74/0833 370/329 |
| 2016/0241323 | A1* | 8/2016  | Ko ....................... H04B 7/0452 |

FOREIGN PATENT DOCUMENTS

| CN | 104812084 A | 7/2015 |
| CN | 104956606 A | 9/2015 |

(Continued)

OTHER PUBLICATIONS

International Search Report in PCT/CN2017/083186 dated Jan. 25, 2018.

(Continued)

*Primary Examiner* — Mohammad S Anwar
(74) *Attorney, Agent, or Firm* — Syncoda LLC; Feng Ma (57) ABSTRACT

A random-access method includes: determining a random-access policy adopted by a current UE according to received configuration information including different policies for instructing random access; determining an uplink physical random-access channel (PRACH) resource corresponding to the adopted policy; and sending a preamble sequence to a base station based on the determined uplink PRACH resource. As such, different policies for instructing random access are comprised in configuration information, so that UE can determine, according to received configuration information, a random-access policy to be adopted by the UE, and determine an uplink PRACH resource corresponding to the adopted policy, and then send a preamble sequence to a base station based on the determined uplink PRACH resource.

18 Claims, 7 Drawing Sheets

(56) References Cited

FOREIGN PATENT DOCUMENTS

| | | |
|---|---|---|
| CN | 105120529 A | 12/2015 |
| CN | 105744591 A | 7/2016 |
| CN | 106171011 A | 11/2016 |
| WO | 2016093754 A1 | 6/2016 |

OTHER PUBLICATIONS

1st Office Action in CN 201780000381.5 dated Mar. 2, 2020.
Chinese Patent Notice of Allowance in Application No. 201780000381. 5, dated Apr. 2, 2021.

\* cited by examiner

RANDOM ACCESS METHOD AND APPARATUS, USER EQUIPMENT, AND COMPUTER READABLE STORAGE MEDIUM

CROSS-REFERENCE TO RELATED APPLICATION

This application is a national stage of International Application No. PCT/CN2017/083186 filed on May 5, 2017, the disclosure of which is hereby incorporated by reference in its entirety.

TECHNICAL FIELD

The present disclosure relates to the field of communication technology, in particular to a random-access method and device, user equipment, and a computer readable storage medium.

BACKGROUND

In the fourth-generation mobile communication technology (4th Generation, abbreviation: 4G) system, a random-access procedure is based on omnidirectional transmission of uplink and downlink signals, and a user equipment (UE) only needs to select proper resources according to system information, and initiate a random access by randomly selecting a preamble sequence on this resource.

However, for systems with a wide range of high frequency, the above random-access method cannot meet the access requirements well.

SUMMARY

In view of this, the present application disclosed a random-access method and a random-access device, a user equipment, and a computer readable storage medium, so as to meet configuration requirements and access requirements of systems with wide range of high frequency.

According to a first aspect of the embodiments of the present disclosure, there is provided a random-access method, the method comprising:

determining, according to received configuration information, a random-access policy adopted by a current UE, the configuration information comprising different policies for instructing random-access;

determining an uplink physical random-access channel (PRACH) resource corresponding to the adopted policy; and sending a preamble sequence to a base station based on the determined uplink PRACH resource.

In an embodiment, if the adopted policy is a first policy, the uplink physical random-access channel PRACH resource corresponding to the adopted policy comprises: a first beam and a preamble sequence code resource set;

if the adopted policy is a second policy, the uplink physical random-access channel PRACH resource corresponding to the adopted policy comprises: a first beam, a second beam and a preamble sequence code resource set;

wherein, the first beam and the second beam are adjacent to each other and each corresponds to a beam of a downlink signal synchronization block.

In an embodiment, sending the preamble sequence to the base station based on the determined uplink PRACH resource comprises:

if the adopted policy is a first policy, selecting a preamble sequence code from the preamble sequence code resources set, and sending a preamble sequence corresponding to the preamble sequence code to the base station on the first beam;

if the adopted policy is a second policy, selecting a preamble sequence code from the preamble sequence code resources set, and sending respectively, a preamble sequence corresponding to the preamble sequence code to the base station on the first beam and on the second beam;

In an embodiment, the preamble sequence code resource set comprises a first preamble sequence code resource set and a second preamble sequence code resource set;

if the adopted policy is the second policy, sending the preamble sequence to the base station based on the determined uplink PRACH resource comprises:

selecting a first preamble sequence code from the first preamble sequence code resources set, and sending a first preamble sequence corresponding to the first preamble sequence code to the base station on the first beam;

selecting a second preamble sequence code from the second preamble sequence code resources set, and sending a second preamble sequence corresponding to the second preamble sequence code to the base station on the second beam.

In an embodiment, the method further comprises:

if the adopted policy is the first policy, and if no random-access response message is received, sending the preamble sequence to the base station on a third beam, wherein the third beam is different from the first beam;

if the adopted policy is the second policy, if no random-access response message is received, increasing transmitting power of the first beam and the second beam, and sending respectively, the preamble sequence to the base station on the first beam and the second beam whose transmitting power have been increased.

In an embodiment, the method further comprises:

after sending the preamble sequence to the base station on the third beam, if no random-access response message is received, increasing transmitting power of the first beam and sending the preamble sequence to the base station on the first beam whose transmitting power has been increased.

In an embodiment, the method further comprises:

after sending the preamble sequence to the base station on the first beam whose transmitting power has been increased, if no random-access response message is received, increasing transmitting power of a fourth beam and sending the preamble sequence to the base station on the fourth beam whose transmitting power has been increased, wherein the fourth beam is different from the first beam.

In an embodiment, the method further comprises:

after sending the preamble sequence to the base station on the first beam and on the second beam respectively, if two random-access response messages are received, obtaining power measurement values of the two random-access response messages;

determining a beam corresponding to a random-access response message with a greater power measurement value, discarding a random-access response message with a lower power measurement value, and sending a connection establishment request to the base station on the determined beam.

According to a second aspect of the embodiments of the present disclosure, there is provided a random-access device, the device comprising:

a first determining module, configured to determine a random-access policy adopted by a current UE according to received configuration information, wherein the configuration information comprises different policies for instructing random access;

a second determining module, configured to determine an uplink physical random-access channel (PRACH) resource corresponding to the adopted policy determined by the first determining module;

a sending module, configured to send a preamble sequence to a base station based on the uplink PRACH resource determined by the second determining module.

In an embodiment, if the adopted policy is a first policy, the uplink physical random-access channel PRACH resource corresponding to the adopted policy comprises:

a first beam and a preamble sequence code resource set;

if the adopted policy is a second policy, the uplink physical random-access channel PRACH resource corresponding to the adopted policy comprises: a first beam, a second beam and a preamble sequence code resource set;

wherein, the first beam and the second beam are adjacent to each other and each corresponds to a beam of a downlink signal synchronization block.

In an embodiment, the sending module comprises:

a first sending submodule, configured to: if the adopted policy is a first policy, select a preamble sequence code from the preamble sequence code resources set, and send a preamble sequence corresponding to the preamble sequence code to the base station on the first beam;

a second sending submodule, configured to: if the adopted policy is a second policy, select a preamble sequence code from the preamble sequence code resources set, and send respectively, a preamble sequence corresponding to the preamble sequence code to the base station on the first beam and on the second beam.

In an embodiment, the preamble sequence code resource set comprises a first preamble sequence code resource set and a second preamble sequence code resource set;

if the adopted policy is a second policy, the sending module comprises:

a third sending submodule, configured to select a first preamble sequence code from the first preamble sequence code resources set, and send a first preamble sequence corresponding to the first preamble sequence code to the base station on the first beam;

a fourth sending submodule, configured to select a second preamble sequence code from the second preamble sequence code resources set, and send a second preamble sequence corresponding to the second preamble sequence code to the base station on the second beam.

In an embodiment, the first sending submodule is further configured to: if the adopted policy is the first policy and if no random-access response message is received, send the preamble sequence to the base station on a third beam, wherein the third beam is different from the first beam;

the second sending submodule is further configured to: if the adopted policy is the second policy, if no random-access response message is received, increase transmitting power of the first beam and the second beam, and send, respectively, the preamble sequence to the base station on the first beam and the second beam whose transmitting power have been increased.

In an embodiment, the first sending submodule is further configured to: after sending the preamble sequence to the base station on the third beam, if still no random-access response message is received, increase transmitting power of the first beam and send the preamble sequence to the base station on the first beam whose transmitting power has been increased.

In an embodiment, the first sending submodule is further configured to: after sending the preamble sequence to the base station on the first beam whose transmitting power has been increased, if still no random-access response message is received, increase transmitting power of a fourth beam and send the preamble sequence to the base station on the fourth beam whose transmitting power has been increased, wherein the fourth beam is different from the first beam.

In an embodiment, the device further comprises:

an obtaining module, configured to: if two random-access response messages are received after the second sending submodule sending the preamble sequence to the base station on the first beam and on the second beam respectively, obtain power measurement values of the two random-access response messages;

a determining, discarding and sending module, configured to determine a beam corresponding to the random-access response message with greater power measurement value obtained by the obtaining module, discard a random-access response message with a lower power measurement value, and send a connection establishment request to the base station on the determined beam.

According to a third aspect of the embodiments of the present disclosure, there is provided a user equipment, which comprises:

a processor;

a memory, used for storing processor executable instructions;

wherein the processor is configured to:

determine a random-access policy adopted by a current UE according to received configuration information, the configuration information comprising different policies for instructing random access;

determine an uplink physical random-access channel (PRACH) resource corresponding to the adopted policy; and send a preamble sequence to a base station based on the determined uplink PRACH resource.

According to a fourth aspect of the embodiments of the present disclosure, there is provided a computer readable storage medium having stored thereon a computer program (instructions), wherein the program (instructions) is executed by a processor to implement the above steps of the method.

The technical solutions provided by the embodiments of the present disclosure can comprise the following beneficial effects:

According to the present disclosure, different policies for instructing random access are comprised in the configuration information, so that a user equipment (UE) can determine, according to received configuration information, a random-access policy to be adopted by itself, and determine an uplink PRACH resource corresponding to the adopted policy, and then send a preamble sequence to a base station based on the determined uplink PRACH resource, meeting configuration requirements and access requirements of systems with a wide range of high frequency.

It is to be understood that both the foregoing general description and the following detailed description are exemplary and explanatory only and should not be taken as a limit to the present disclosure.

DETAILED DESCRIPTION

Hereinafter, the technical solutions in the embodiments of the present application will be described clearly and thoroughly with reference to the accompanying drawings of the embodiments of the present application. Obviously, the embodiments as described are only a part, but not all, of the embodiments of the present application. All other embodiments obtained by those skilled in the art based on the embodiments in the present application without any inventive work shall fall within the protection scope of the present disclosure.

In order to meet access requirements of systems with a wide range of high frequency, in the embodiment of the present disclosure, different policies for instructing random access are comprised in configuration information, that is, a system with a relatively low frequency can adopt a first policy and a system with a relatively high frequency can adopt a second policy (the low frequency and high frequency herein are relative concepts, for example, 50 GHz is a lower frequency with respect to 60 GHz, but both 50 GHz and 60 GHz belong to high frequency), so a user equipment (UE) can determine a random-access policy adopted by itself according to received configuration information, and determine an uplink Physical Random-access Channel (PRACH) resource corresponding to the adopted policy, and then send a preamble sequence to a base station based on the determined uplink PRACH resource. The details will be described below in connection with embodiments.

Figure 1:
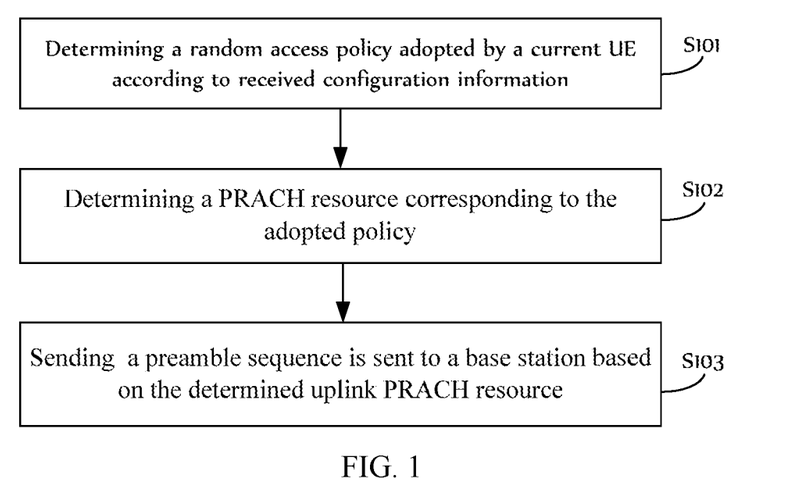
FIG. 1 is a flowchart of a random-access method according to an exemplary embodiment of the present application.

FIG. 1 is a flowchart of a random-access method, according to an exemplary embodiment of the present application, the embodiment is described from a UE side. As illustrated in FIG. 1, the random-access method comprises the following steps.

In step S101, according to received configuration information, a random-access policy adopted by a current UE is determined, wherein the configuration information comprises different policies for instructing random access.

Wherein the different policies for instructing random access can comprise operating frequency bands of the system and corresponding policies adopted by the random access. For example, when the operating frequency band of the system is 6 to 20 GHz, the corresponding policy adopted by the random access is a first policy, when the operating frequency band of the system is 20 to 60 GHz, the corresponding policy adopted by the random access is a second policy. Because the configuration information comprises the operating frequency band of the system and the corresponding policies adopted by the random access, for a system with a wide range of high frequency, a random-access policy adopted by the current UE can be determined according to the operating frequency band.

The above 6-20 GHZ and 20-60 GHZ are only examples. In practical applications, operating frequency bands corresponding to different policies can be flexibly set according to requirements.

In addition, before performing step S101 above, the UE may receive the foregoing configuration information sent by the base station in advance.

In step S102, a PRACH resource corresponding to the adopted policy is determined.

When the adopted policy is a first policy, an uplink physical random-access channel PRACH resource corresponding to the adopted policy may comprise: a first beam and a preamble sequence code resource set. When the adopted policy is a second policy, an uplink physical random-access channel PRACH resource corresponding to the adopted policy comprises: a first beam, a second beam and a preamble sequence code resource set, wherein, a first beam and a second beam are adjacent to each other and each corresponds to a beam of a downlink signal synchronization block.

It should be noted that the first policy and the second policy are used to indicate that they are different policies. Similarly, a first beam and the second beam are used to indicate that they are different beams and are adjacent to each other.

In step S103, based on the determined uplink PRACH resource, a preamble sequence is sent to a base station.

When the adopted policy is the first policy, the UE can select a preamble sequence code from the preamble sequence code resources set, and send a preamble sequence corresponding to the preamble sequence code to the base station on the first beam. When the adopted policy is a second policy, the UE may select a preamble sequence code from the preamble sequence code resources set, and send a preamble sequence corresponding to the preamble sequence code to the base station on the first beam and on the second beam respectively.

It can be seen that, for the first policy, the UE sends one preamble sequence, for the second policy, the UE sends a preamble sequence on two adjacent beams respectively, that is, two preamble sequences are sent in total. As the operating frequency of the system is higher, the signal attenuation is greater, and the random-access success rate is lower. However, the present disclosure can greatly improve the success rate of random access through sending two preamble sequences.

According to the above embodiment, different policies for instructing random access are comprised in configuration information, so that user equipment (UE) can determine a random-access policy to be adopted by the UE according to received configuration information, and determine an uplink PRACH resource corresponding to the adopted policy, and then send a preamble sequence to a base station based on the determined uplink PRACH resource, meeting configuration requirements and access requirements of systems with a wide range of high frequency.

Figure 2:
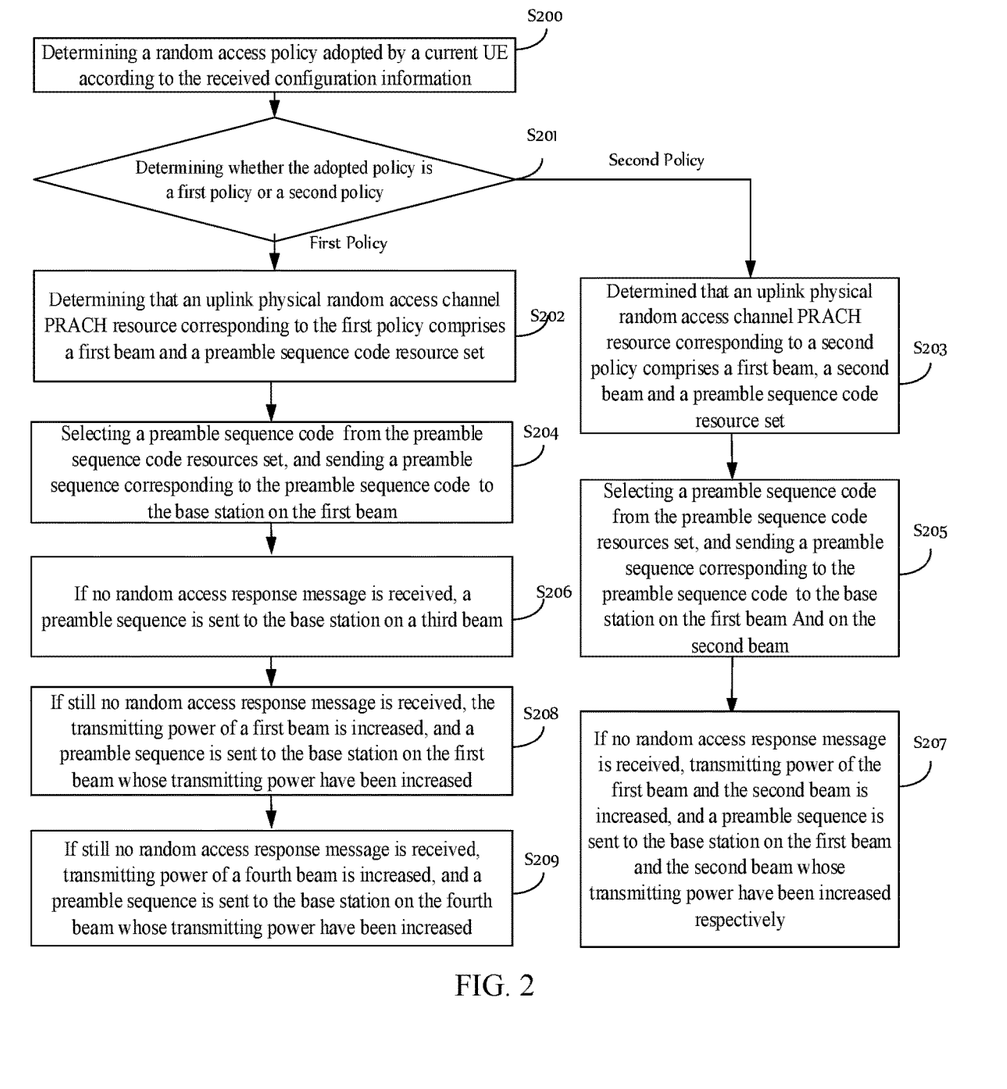
FIG. 2 is a flowchart of another random-access method according to an exemplary embodiment of the present application.

FIG. 2 is a flowchart of another random-access method according to an exemplary embodiment of the present application. As illustrated in FIG. 2, the random-access method comprises the following steps.

In step S200, according to the received configuration information, a random-access policy adopted by a current UE is determined.

In step S201, it is determined whether the adopted policy is a first policy or a second policy. If the adopted policy is a first policy, step S202 will be performed, and if the adopted policy is a second policy, step S203 will be performed.

In step S202, it is determined that an uplink physical random-access channel PRACH resource corresponding to the first policy comprises a first beam and a preamble sequence code resource set, and step S204 will be performed.

In step S203, it is determined that an uplink physical random-access channel PRACH resource corresponding to a second policy comprises a first beam, a second beam and a preamble sequence code resource set, and step S205 will be performed.

In step S204, a preamble sequence code is selected from the preamble sequence code resources set, and a preamble sequence corresponding to the preamble sequence code is sent to the base station on the first beam, and step S206 will be performed.

In step S205, a preamble sequence code is selected from the preamble sequence code resources set, and a preamble sequence corresponding to the preamble sequence code is sent to the base station on the first beam and on the second beam respectively, and step S207 will be performed.

Wherein, the preamble sequence code resource set can comprise a first preamble sequence code resource set and a second preamble sequence code resource set. In this embodiment, in addition to sending the preamble sequence in the manner illustrated in step S205, the preamble sequence may also be sent in the following manner: selecting a first preamble sequence code from the first preamble sequence code resource set, and sending a first preamble sequence corresponding to the first preamble sequence code, to the base station on the first beam, and selecting a second preamble sequence code from the second preamble sequence code resource set, and sending a second preamble sequence corresponding to the second preamble sequence code to a base station on the second beam.

Since received powers of the first beam and the second beam can be measured before sending the preamble sequence, if the received power of the first beam is greater than the received power of the second beam, the first preamble sequence can be sent on the first beam with a greater power, and the second preamble sequence can be sent on the second beam with a lower power, so as to improve the current UE access success rate while reducing interference to random access of other UE.

In the step S206, if no random-access response message is received, a preamble sequence is sent to the base station on a third beam, and the step S208 will be performed.

Wherein, the third beam is different from the first beam. It should be noted that the third beam is used to indicate a beam different from the first beam, that is, any beam other than the first beam.

In step S207, if no random-access response message is received, transmitting power of the first beam and the second beam is increased, and a preamble sequence is sent to the base station on the first beam and the second beam whose transmitting power have been increased respectively, then the operations are finished.

In step S208, if still no random-access response message is received, the transmitting power of a first beam is increased, and a preamble sequence is sent to the base station on the first beam whose transmitting power have been increased.

In step S209, if still no random-access response message is received, transmitting power of a fourth beam is increased, and a preamble sequence is sent to the base station on the fourth beam whose transmitting power have been increased.

Wherein, the fourth beam is different from the first beam. It should be noted that the fourth beam is used to indicate a beam different from the first beam, that is, any beam other than the first beam.

After the UE fails to send a preamble sequence, the UE first performs adjustment on the beam. If the UE still fails to send a preamble sequence, the UE increases the power of the original beam, that is, the first beam. If the UE still fails to send a preamble sequence, the UE replaces the beam and increase the power.

In the above embodiment, by describing the random-access process of the UE under different policies, the access requirements of systems with a wide band of high frequency is well meet.

Figure 3:
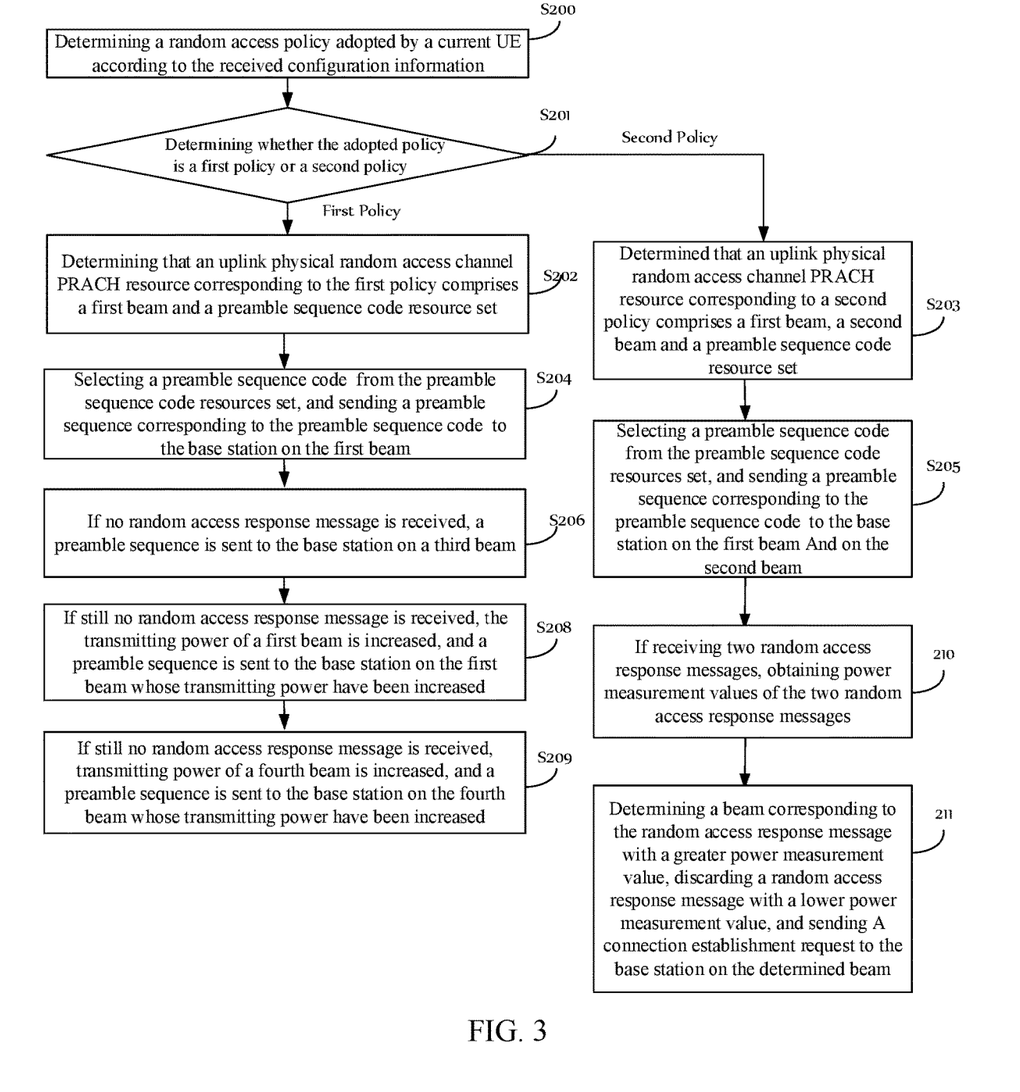
FIG. 3 is a flowchart of another random-access method according to an exemplary embodiment of the present application.

FIG. 3 is a flowchart of another random-access method, according to an exemplary embodiment of the present application. As illustrated in FIG. 3, after the step S205, the random-access method comprises the following steps.

In step S210, if two random-access response messages are received, power measurement values of the two random-access response messages are obtained.

In step S211, a beam corresponding to the random-access response message with a greater power measurement value is determined, a random-access response message with a lower power measurement value is discarded, and a connection establishment request is sent to the base station on the determined beam.

In this embodiment, after obtaining the power measurement values of the two random-access response messages, by comparing magnitudes of the power measurement values of the two random-access response messages, and discarding the random-access response message with the lower power measurement value, and then sending the connection establishment request to the base station on the beam corresponding to the random-access response message with the greater power measurement value, that is, only one connection establishment request is sent, the random-access success rate is improved.

In above embodiment, by discarding the random-access response message with lower power measurement value and sending the connection establishment request to the base station on the beam corresponding to the random-access response message with greater power measurement value, the random access is improved.

Figure 4:
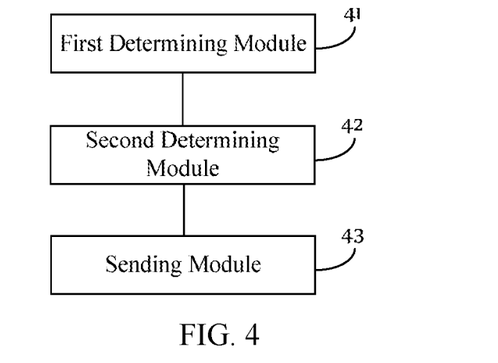
FIG. 4 is a block diagram of a random-access device according to an exemplary embodiment.

FIG. 4 is a block diagram of a random-access device according to an exemplary embodiment. As illustrated in FIG. 4, the device comprises: a first determining module 41, a second determining module 42 and a sending module 43.

The first determining module 41 is configured to determine a random-access policy adopted by a current UE according to the received configuration information, wherein the configuration information comprises different policies for instructing random access.

Wherein, the different policies for instructing random access can comprise the operating frequency band of the system and the corresponding policies adopted by the random access. For example, when the range of the operating frequency band of the system is 6 to 20 GHz, the corresponding policy adopted by the random access is a first policy, when the range of the operating frequency band of the system is 20 to 60 GHz, the corresponding policy adopted by the random access is a second policy. Because the configuration information comprises the operating frequency band of the system and the corresponding policies adopted by the random access, for systems with a wide range of high frequency, the policy adopted by the current UE when performing random access can be determined according to the operating frequency band.

The above 6-20 GHZ and 20-60 GHZ are only examples. In practical applications, the operating frequency bands corresponding to different policies can be flexibly set according to requirements.

The second determining module 42 is configured to determine an uplink physical random-access channel (PRACH) resource corresponding to the adopted policy determined by the first determining module 41.

When the adopted policy is the first policy, the uplink physical random-access channel PRACH resource corresponding to the adopted policy can comprise: a first beam and a preamble sequence code resource set. When the adopted policy is the second policy, the uplink physical random-access channel PRACH resource corresponding to the adopted policy comprises: a first beam, a second beam and a preamble sequence code resource set, wherein, the first beam and the second beam are adjacent to each other and each corresponds to a beam of a downlink signal synchronization block.

It should be noted that the first policy and the second policy are used to indicate that they are different policies. Similarly, the first beam and the second beam are used to indicate that they are different beams and are adjacent to each other.

The sending module 43 is configured to send a preamble sequence to a base station based on the uplink PRACH resource determined by the second determining module 42.

If the adopted policy is the first policy, the UE can select a preamble sequence code from the preamble sequence code resources set, and send a preamble sequence corresponding to the preamble sequence code to the base station on the first beam. If the adopted policy is the second policy, the UE can select a preamble sequence code from the preamble sequence code resources set, and send a preamble sequence corresponding to the preamble sequence code to the base station on the first beam and on the second beam respectively.

It can be seen that, for the first policy, the UE sends one preamble sequence, for the second policy, the UE sends one preamble sequence on two adjacent beams respectively, that is, two preamble sequences are sent in total. As the operating frequency of the system is higher, the signal attenuation is greater, and the random-access success rate is lower. However, the present disclosure can greatly improve the success rate of random access by sending two preamble sequences.

The device illustrated in FIG. 4 is used to implement the method illustrated in FIG. 1, and descriptions of the related content are the same, and will not be elaborated here.

According to the above embodiment, different policies for instructing random access are comprised in the configuration information, so that the user equipment (UE) can determine, according to received configuration information, a random-access policy to be adopted by the UE, and determine an uplink PRACH resource corresponding to the adopted policy, and then send a preamble sequence to a base station based on the determined uplink PRACH resource, meeting configuration requirements and access requirements of systems with a wide range of high frequency.

Figure 5:
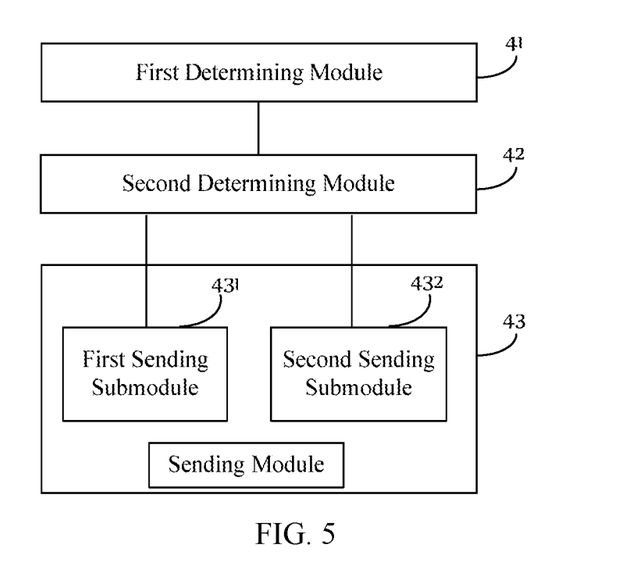
FIG. 5 is a block diagram of a random-access device according to an exemplary embodiment.

FIG. 5 is a block diagram of another random-access device according to an exemplary embodiment. As illustrated in FIG. 5, on the basis of the above embodiment illustrated in FIG. 4, the sending module 43 can comprise: a first sending submodule 431 and a second sending submodule 432.

The first sending submodule 431 is configured to: if the adopted policy is the first policy, select a preamble sequence code from the preamble sequence code resources set, and send a preamble sequence corresponding to the preamble sequence code to the base station on the first beam.

A second sending submodule 432 is configured to: if the adopted policy is the second policy, select a preamble sequence code from the preamble sequence code resources set, and send respectively, a preamble sequence corresponding to the preamble sequence code to the base station on the first beam and on the second beam.

In another embodiment, the first sending submodule 431 is further configured to: if the adopted policy is the first policy and no random-access response message is received, send a preamble sequence to the base station on a third beam, wherein the third beam is different from a first beam. The second sending submodule 432 is further configured to: if the adopted policy is the second policy, if no random-access response message is received, increase a transmitting power of the first beam and the second beam, and send respectively, a preamble sequence to the base station, on the first beam and the second beam whose transmitting power have been increased.

Wherein, the third beam is different from the first beam. It should be noted that the third beam is used to indicate a beam different from the first beam, that is, any beam other than the first beam.

In another embodiment, the first sending submodule 431 is further configured to: after sending the preamble sequence to the base station on the third beam, if still no random-access response message is received, increase transmitting power of the first beam and send a preamble sequence to the base station on the first beam whose transmitting power has been increased.

In another embodiment, the first sending submodule 431 is further configured to: after sending the preamble sequence to the base station on the first beam whose transmitting power has been increased, if still no random-access response message is received, increase transmitting power of the fourth beam and send the preamble sequence to the base station on the fourth beam whose transmitting power has been increased, wherein the fourth beam is different from a first beam.

Wherein, the fourth beam is different from the first beam. It should be noted that the fourth beam is used to indicate a beam different from the first beam, that is, any beam other than the first beam.

In the above embodiment, by describing the random-access process of the UE under different policies, the access requirements of systems with a wide range of high frequency is well meet.

Figure 6:
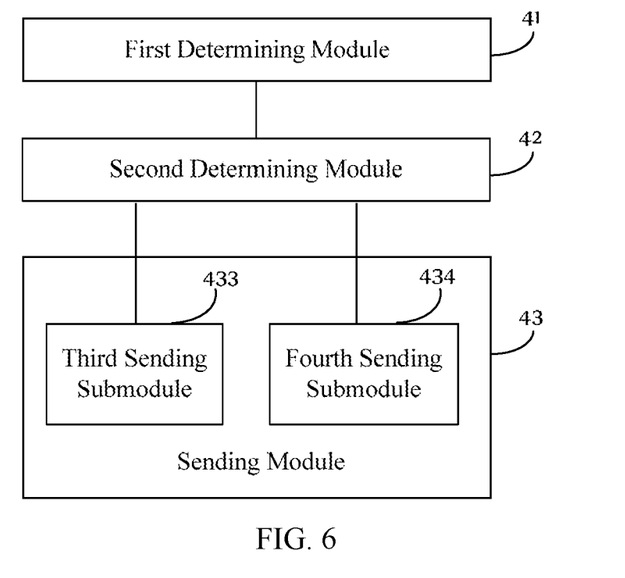
FIG. 6 is a block diagram of a random-access device according to an exemplary embodiment.

FIG. 6 is a block diagram of another random-access device according to an exemplary embodiment. As illustrated in FIG. 6, on the basis of the above embodiment illustrated in FIG. 4, a preamble sequence code resource set can comprise a first preamble sequence code resource set and a second preamble sequence code resource set; when the adopted policy is the second policy, the sending module 43 can comprise: a third sending submodule 433 and a fourth sending submodule 434.

The third sending submodule 433 is configured to select a first preamble sequence code from the first preamble sequence code resources set, and send a first preamble sequence corresponding to the first preamble sequence code to the base station on the first beam.

The fourth sending submodule 434 is configured to select a second preamble sequence code from a second preamble sequence code resources set, and send a second preamble sequence corresponding to the second preamble sequence code to the base station on the second beam.

Since received power of the first beam and the second beam can be measured before sending the preamble sequence, if the received power of the first beam is greater than the received power of the second beam, the first preamble sequence can be sent on the first beam with greater power, and the second preamble sequence can be sent on the second beam with lower power, so as to improve the current UE access success rate while reducing interference to random access of other UE.

In the foregoing embodiment, it is possible to improve the current UE access success rate while reducing interference to random access of other UE.

Figure 7:
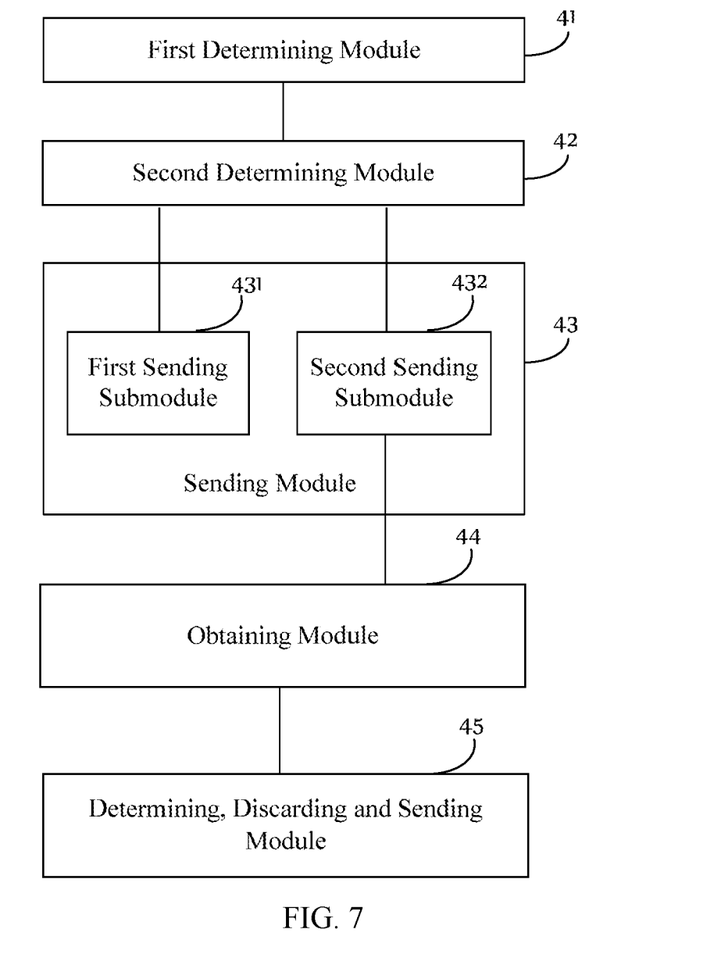
FIG. 7 is a block diagram of a random-access device according to an exemplary embodiment.

FIG. 7 is a block diagram of another random-access device according to an exemplary embodiment. As illustrated in FIG. 7, on the basis of the above embodiment illustrated in FIG. 5, the device can comprise: an obtaining module 44 and a determining, discarding and sending module 45.

An obtaining module 44 is configured to: if two random-access response messages are received after a second sending submodule 432 sending a preamble sequence to the base station on the first beam and on the second beam respectively, obtain power measurement values of two random-access response messages.

A determining, discarding and sending module 45 is configured to determine a beam corresponding to a random-access response message with greater power measurement value obtained by an obtaining module 44, discard a random-access response message with lower power measurement value, and send a connection establishment request to the base station on the determined beam.

In this embodiment, after obtaining the power measurement values of the two random-access response messages, by comparing magnitudes of the power measurement values of the two random-access response messages, and discarding the random-access response message with lower power measurement value, and then sending the connection establishment request to the base station on the beam corresponding to the random-access response message with greater power measurement value, that is, only one connection establishment request is sent, the random-access success rate is improved.

In above embodiment, sending the connection establishment request is sent to the base station on the beam corresponding to the random-access response message with greater power measurement value while discarding a random-access response message with a small power measurement value, the random-access success rate is improved.

Figure 8:
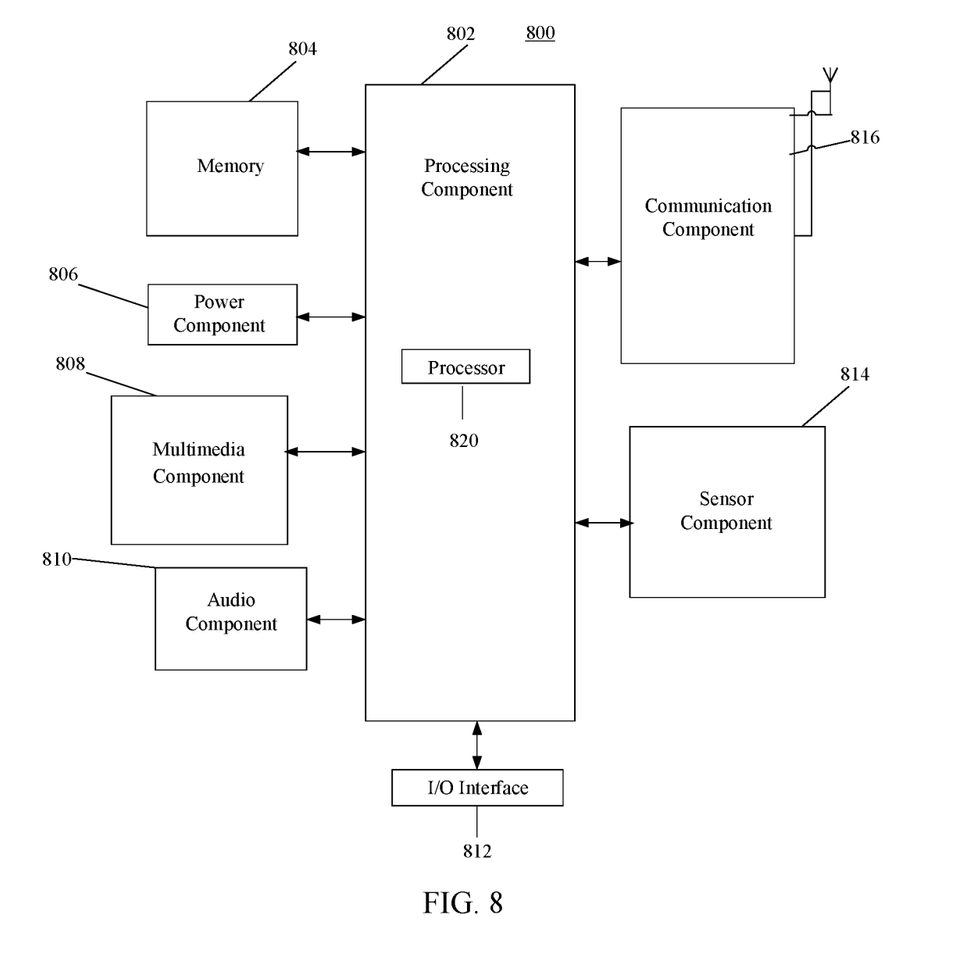
FIG. 8 is a block diagram applicable to a random-access device according to an exemplary embodiment.

FIG. 8 is a block diagram appropriate to a random-access device according to an exemplary embodiment. For example, a device 800 can be a user device such as a mobile phone, computer, digital broadcast terminal, messaging device, game console, tablet device, medical device, fitness device, personal digital assistant, and the like.

Referring to FIG. 8, a device 800 may comprise one or more of the following components: a processing component 802, a memory 804, a power component 806, a multimedia component 806, an audio component 810, an input/output (I/O) interface 812, a sensor component 814, and a communication component 816.

The processing component 802 typically controls overall operations of the device 800, such as operations associated with display, telephone calls, data communications, camera operations, and recording operations. The processing component 802 can comprise one or more processors 820 to execute instructions to perform all or part of the steps of the above described methods. Moreover, the processing component 802 can comprise one or more modules to facilitate interaction between the processing component 802 and other components. For example, the processing component 802 can comprise a multimedia module to facilitate interaction between the multimedia component 808 and the processing component 802.

The memory 804 is configured to store various types of data to support operations at device 800. Examples of such data comprise instructions for any application or method run on the device 800, contact data, phone book data, messages, pictures, videos, and the like. The memory 804 can be implemented by any type of volatile or non-volatile storage device or a combination thereof, such as Static Random-access Memory (SRAM), Electrically Erasable Programmable Read Only Memory (EEPROM), Erasable Programmable Read Only Memory (EPROM), Programmable Read Only Memory (PROM), Read Only Memory (ROM), Magnetic Memory, Flash Memory, Magnetic Disk or Optical Disk.

The power component 806 provides power to various components of the device 800. The power component 806 can comprise a power management system, one or more power sources, and other components associated with generating, managing, and distributing power for the device 800.

The multimedia component 808 comprises a screen between the device 800 and the user that provides an output interface. In some embodiments, the screen may comprise a Liquid Crystal Display (LCD) and a Touch Panel (TP). If the screen comprises a touch panel, the screen can be implemented as a touch screen to receive input signals from the user. The touch panel comprises one or more touch sensors to sense touches, slides, and gestures on the touch panel. The touch sensor can sense not only the boundaries of the touch or sliding action, but also duration and pressure associated with the touch or slide operation. In some embodiments, the multimedia component 808 comprises a front camera and/or a rear camera. When the device 800 is in an operation mode, such as a shooting mode or a video mode, the front camera and/or the rear camera can receive external multimedia data. Each front and rear camera can be a fixed optical lens system or have focal length and optical zoom capabilities.

The audio component 810 is configured to output and/or input an audio signal. For example, the audio component 810 comprises a microphone (MIC) that is configured to receive an external audio signal when the device 800 is in an operational mode, such as a call mode, a recording mode, and a voice recognition mode. The received audio signal may be further stored in the memory 804 or sent via the communication component 816. In some embodiments, the audio component 810 further comprises a speaker for outputting an audio signal.

The I/O interface 812 provides an interface between the processing component 802 and peripheral interface modules, which may be a keyboard, a click wheel, a button, or the like. These buttons may comprise, but are not limited to, a home button, a volume button, a start button, and a lock button.

Sensor assembly 814 comprises one or more sensors for providing status assessment of various aspects to the device 800. For example, the sensor component 814 can detect an ON/OFF state of the device 800, a relative positioning of components, such as a display and a keypad of the device 800, and the sensor component 814 can also detect a change in position of a component of the device 800 or the device 800, presence or absence of contact between the user and the device 800, the orientation or acceleration/deceleration of the device 800 and temperature change of the device 800. The sensor assembly 814 can comprise a proximity sensor configured to detect presence of nearby objects without any physical contact. The sensor component 814 can further comprise a light sensor, such as a CMOS or CCD image sensor, for use in imaging applications. In some embodiments, the sensor assembly 814 may further comprise an acceleration sensor, a gyro sensor, a magnetic sensor, a pressure sensor, or a temperature sensor.

The communication component 816 is configured to facilitate wired or wireless communication between the device 800 and other devices. The device 800 can access a wireless network under a communication standard, such as Wi-Fi, 2G or 3G, or a combination thereof. In an exemplary embodiment, the communication component 816 receives broadcast signals or broadcast associated information from an external broadcast management system via a broadcast channel. In an exemplary embodiment, the communication component 816 further comprises a near field communication (NFC) module to facilitate short range communication. For example, the NFC module can be implemented based on Radio Frequency Identification (RFID) technology, Infrared Data Association (IrDA) technology, Ultra-wideband (UWB) technology, Bluetooth (BT) technology, and other technologies.

In an exemplary embodiment, the device 800 may be one or more of application specific integrated circuits (ASICs), digital signal processors (DSPs), digital signal processing devices (DSPDs), programmable logic devices (PLDs), field programmable gate array (FPGA), controllers, microcontrollers, microprocessors, or other electronic components used for performing the above methods.

In an exemplary embodiment, there is further provided a non-transitory computer readable storage medium comprising instructions, such as a memory 804 comprising instructions executable by a processor 820 of the device 800 to perform the above method. For example, the non-transitory computer readable storage medium can be a ROM, a random-access memory (RAM), a CD-ROM, a magnetic tape, a floppy disk, and an optical data storage device.

For the device embodiment, since it basically corresponds to the method embodiment, reference can be made to the description of the portion of the method embodiment. The embodiments of the device described above are merely illustrative, wherein the units described as separate components may or may not be physically separate, and the components displayed as units may or may not be physical units, i.e., they may be located a place, or they can be distributed to multiple network units. Some or all of the modules may be selected according to actual requirements to achieve the purpose of the solution of the embodiment. Those of ordinary skill in the art can understand and implement without any creative effort.

It should be noted that, in this context, relational terms such as first and second are used merely to distinguish one entity or operation from another entity or operation, and do not necessarily require or imply that there is any such actual relationship or order between these entities or operations. The terms "including", "comprising" or any other variation thereof are intended to include a non-exclusive inclusion, such that a process, method, article, or device that comprises a plurality of elements includes not only those elements but also other elements not specifically listed, or elements that are inherent to such a process, method, item, or device. An element that is defined by the phrase "comprising a . . . " does not exclude presence of additional equivalent elements in the process, method, item, or device that comprises the element.

The method and the device provided by the embodiments of the present invention are described in detail above. The principles and implementations of the present invention are described in the specific examples. The description of the above embodiments is only used to help understanding the method of the present invention, and at the same time, there will be changes in the specific embodiments and the applications according to the idea of the present invention, and the contents of the present specification should not be construed as a limit to the present invention.

The invention claimed is:

1. A random-access method, wherein the method comprises:
   determining a random-access policy adopted by a current UE according to received configuration information, the configuration information comprising different policies for instructing random access;
   determining an uplink physical random-access channel (PRACH) resource corresponding to the adopted policy; and
   sending a preamble sequence to a base station based on the determined uplink PRACH resource,
   wherein, when the adopted policy is a first policy, the uplink physical random-access channel PRACH resource corresponding to the adopted policy comprises: a first beam and a preamble sequence code resource set; and
   when the adopted policy is a second policy, the uplink physical random-access channel PRACH resource corresponding to the adopted policy comprises: a first beam, a second beam and a preamble sequence code resource set, wherein the first beam and the second beam are adjacent to each other and each corresponds to a beam of a downlink signal synchronization block.

2. The method according to claim 1, wherein, said sending the preamble sequence to the base station based on the determined uplink PRACH resource comprises:
   when the adopted policy is the first policy, selecting a preamble sequence code from the preamble sequence code resources set, and sending a preamble sequence corresponding to the preamble sequence code to the base station on the first beam; and
   when the adopted policy is the second policy, selecting a preamble sequence code from the preamble sequence code resources set, and sending a preamble sequence corresponding to the preamble sequence code to the base station on the first beam and on the second beam, respectively.

3. The method according to claim 2, further comprising:
   when the adopted policy is the first policy and no random-access response message is received, sending the preamble sequence to the base station on a third beam, wherein the third beam is different from the first beam; and
   when the adopted policy is the second policy and still no random-access response message is not received, increasing transmitting power of the first beam and the second beam, and sending the preamble sequence to the base station on the first beam and the second beam whose transmitting power have been increased, respectively.

4. The method according to claim 3, further comprising:
when still no random-access response message is received after sending the preamble sequence to the base station on the third beam, increasing transmitting power of the first beam and sending the preamble sequence to the base station on the first beam whose transmitting power has been increased.

5. The method according to claim 4, further comprising:
if still no random-access response message is received after sending the preamble sequence to the base station on the first beam whose transmitting power has been increased, increasing transmitting power of a fourth beam and sending the preamble sequence to the base station on the fourth beam whose transmitting power has been increased, wherein the fourth beam is different from the first beam.

6. The method according to claim 2, further comprising:
when two random-access response messages are received after sending the preamble sequence to the base station on the first beam and on the second beam, respectively, obtaining power measurement values of the two random-access response messages;
determining a beam corresponding to a random-access response message with greater power measurement value, discarding a random-access response message with lower power measurement value, and sending a connection establishment request to the base station on the determined beam.

7. The method according to claim 1, wherein the preamble sequence code resource set comprises a first preamble sequence code resource set and a second preamble sequence code resource set;
when the adopted policy is the second policy, sending the preamble sequence to the base station based on the determined uplink PRACH resource comprises:
selecting a first preamble sequence code from the first preamble sequence code resources set, and sending a first preamble sequence corresponding to the first preamble sequence code to the base station on the first beam; and
selecting a second preamble sequence code from the second preamble sequence code resources set, and sending a second preamble sequence corresponding to the second preamble sequence code to the base station on the second beam.

8. A non-transitory computer readable storage medium having instructions stored thereon, wherein the instructions are executable by a processor to implement steps of the method of claim 1.

9. A communication system implementing the method of claim 1, wherein the different policies a first policy for a first system frequency, and a second policy for a second system frequency.

10. The communication system of claim 9, wherein the first system frequency is 6-20 GHz, and the second system frequency is 20-60 GHz.

11. The communication system of claim 10, comprising the UE and the base station.

12. User equipment (UE), comprising:
a processor;
a memory, used for storing processor executable instructions;
wherein the processor is configured to:
determine a random-access policy adopted by the UE according to received configuration information, the configuration information comprising different policies for instructing random access;
determine an uplink physical random-access channel (PRACH) resource corresponding to the adopted policy; and
send a preamble sequence to a base station based on the determined uplink PRACH resource,
wherein, in a case that the adopted policy is a first policy, the uplink physical random-access channel PRACH resource corresponding to the adopted policy comprises: a first beam and a preamble sequence code resource set; and
in a case that the adopted policy is a second policy, the uplink physical random-access channel PRACH resource corresponding to the adopted policy comprises: a first beam, a second beam and preamble sequence code resource set, wherein, the first beam and the second beam are adjacent to each other and each corresponds to a beam of a downlink signal synchronization block.

13. The user equipment according to claim 12, wherein, upon configured to send the preamble sequence to the base station based on the determined uplink PRACH resource, the processor is configured to:
in a case that the adopted policy is the first policy, select a preamble sequence code from the preamble sequence code resources set, and send a preamble sequence corresponding to the preamble sequence code to the base station on the first beam; and
in a case that the adopted policy is the second policy, select a preamble sequence code from the preamble sequence code resources set, and send a preamble sequence corresponding to the preamble sequence code to the base station on the first beam and on the second beam, respectively.

14. The user equipment according to claim 13, wherein the process is configured to:
in a case that the adopted policy is the first policy and no random-access response message is received, send the preamble sequence to the base station on a third beam, wherein the third beam is different from the first beam; and
in a case that the adopted policy is the second policy and still no random-access response message is not received, increase transmitting power of the first beam and the second beam, and send the preamble sequence to the base station on the first beam and the second beam whose transmitting power have been increased, respectively.

15. The user equipment according to claim 14, wherein the process is further configured to:
in a case that still no random-access response message is received after sending the preamble sequence to the base station on the third beam, increase transmitting power of the first beam and send the preamble sequence to the base station on the first beam whose transmitting power has been increased.

16. The user equipment according to claim 15, wherein, the processor is further configured to:
in a case that still no random-access response message is received after sending the preamble sequence to the base station on the first beam whose transmitting power has been increased, increase transmitting power of a fourth beam and send the preamble sequence to the base station on the fourth beam whose transmitting power has been increased, wherein the fourth beam is different from the first beam.

17. The user equipment according to claim 13, wherein the process is further configured to:

in a case that two random-access response messages are received after sending the preamble sequence to the base station on the first beam and on the second beam, respectively, obtain power measurement values of the two random-access response messages; and determine a beam corresponding to a random-access response message with greater power measurement value, discard a random-access response message with lower power measurement value, and send a connection establishment request to the base station on the determined beam.

18. The user equipment according to claim 12, wherein, the preamble sequence code resource set comprises a first preamble sequence code resource set and a second preamble sequence code resource set; in a case that the adopted policy is the second policy, when configured to send the preamble sequence to the base station based on the determined uplink PRACH resource, the processor is configured to: select a first preamble sequence code from the first preamble sequence code resources set, and send a first preamble sequence corresponding to the first preamble sequence code to the base station on the first beam; and select a second preamble sequence code from the second preamble sequence code resources set, and send a second preamble sequence corresponding to the second preamble sequence code to the base station on the second beam.

* * * * *